Patented Sept. 4, 1951

2,567,140

UNITED STATES PATENT OFFICE 2,567,140

PREPARATION OF AN IRON OXIDE-MAGNESIUM CHROMATE CATALYST

Kenneth D. Ashley and William B. Innes, Stamford, Conn., assignors to American Cyanamid Company, New York, N. Y., a corporation of Maine No Drawing. Application June 21, 1949,
Serial No. 100,532

4 Claims. (Cl. 252—468)

This invention relates to a method for the production of catalysts of improved activity for the reaction of carbon monoxide with steam to produce carbon dioxide and hydrogen, and to an improved type of catalyst composition.

Catalysts composed of iron oxide and magnesium oxide, promoted by the addition of a small quantity of potassium bichromate, have been used for carrying out the so-called water gas reaction for many years. These catalysts are usually prepared by mixing the iron oxide and magnesium oxide with a water solution of potassium bichromate to form a paste which is dried to a powder of about 5% water content by heating at 100–140° C. and then formed into pellets by compacting in an automatic tablet-forming machine to produce an autogenous bond. The tablets so obtained have a physical strength corresponding to an average crushing weight of about 20 lbs. for tablets of ⅜" diameter. This strength increases slightly during the initial period of use of the catalyst.

It is a principal object of the present invention to provide an improved method of manufacturing catalysts of the above type, which method will produce pelleted catalysts combining the advantages of high activity and greater mechanical strength. A further important advantage is the production of catalysts which have a long effective life, even when used with gases that contain impurities that would reduce the activity of the prior art catalysts described above.

The catalysts of our invention, like those that have previously been used, contain iron oxide together with about 10%–100% of its weight of magnesia as their principal constituents. The present invention, however, employs an adsorbent type of magnesium oxide known commercially as "active magnesia." By employing this type of magnesia, and by modifying the manufacturing procedures as will subsequently be described, we have obtained catalysts combining improved activity with greater mechanical strength.

The active magnesia which we employ is obtained by calcining precipitated magnesium hydroxide at a relatively low temperature or, if higher calcination temperatures are used, for a relatively short time. Ordinarily the precipitated magnesium hydroxide is calcined on a temperature-time schedule varying from 300–400° C. for 4 hours to 625–750° C. for 0.5 hour. The resulting products are most readily identified by the fact that they possess definite iodine numbers, indicative of their ability to adsorb iodine from a carbon tetrachloride solution thereof. These iodine values will vary from about 25, in the case of a magnesia calcined for 4 hours at 300–400° C., to 150 or more when a calcination at 750° C. for 0.5 hour is used. The iodine value is determined in the usual manner by shaking a weighed sample of the calcined magnesia with an 0.1 N solution of iodine in carbon tetrachloride, transferring an aliquot portion of the supernatant iodine solution to a measured quantity of 0.03 N potassium iodide in ethanol and titrating with standard 0.05 N sodium thiosulfate. The iodine number is calculated by subtracting the amount of thiosulfate used from the amount required for an equal quantity of the original iodine solution and multiplying the result by 250 times the normality of the sodium thiosulfate.

In carrying out the process of our invention we first prepare a uniform dry mixture of the powdered active magnesia with an iron oxide ($Fe_2O_3$) which is preferably of pigment grade having an average particle size of less than one micron diameter. Into this mixture we incorporate uniformly about 3–40% of magnesium chromate. This may be done by adding an aqueous solution of chromic acid containing about 2–50% of $CrO_3$, based on the weight of the magnesia, which reacts readily with a portion of the active magnesia present in the dry mixture. Alternatively an equivalent amount of a separately prepared magnesium chromate solution may be added; in this case the amount of dry magnesia mixed with the iron oxide is reduced accordingly. In either case an amount of water is added, usually within the range of about 50–100% on the weight of the magnesia, which is sufficient to hydrate all of the magnesia and, in addition, to provide a free moisture content of about 3–10% in the finished mixture. This excess moisture accelerates the hydration of the magnesia, prevents dust formation and aids in producing a granular powder that is easily pelleted on an automatic pelleting machine.

Some of the free moisture of the composition reacts with the magnesia before pelleting; the degree of hydration of the magnesia at this point is usually about 20–35%. The material is then a free-flowing powder, and in this condition it is pressed into pellets in a tabletting machine which is preferably of the automatic type.

The catalyst pellets from the tabletting machine are aged or conditioned in a closed container in order to complete the reaction between their water content and the magnesium oxide and magnesium chromate with the formation of a set hydraulic cement. This increases their mechanical strength by a factor of two to five or more and produces a bond that is not materially weakened during the subsequent calcination. The aging or conditioning may be carried out at room temperature during about 5-24 hours or longer, depending on the degree of mechanical strength desired, or for a correspondingly reduced time at elevated temperatures up to 100° C., at which temperature only about 30 minutes is required. After aging the pellets are dehydrated by calcining them at 500-650° C. preferably at 575-625° C. for about 1 hour, which increases still further the activity of the magnesia and improves the porosity and activity of the catalyst as a whole.

We have also found that the heat stability of the catalyst can be improved if desired by incorporating therein a small amount of alumina. This is accomplished by adding to the original ferrous oxide-magnesia mixture about 0.5% to 2%, based on the weight of the iron oxide, of an active form of alumina such as bauxite, alumina gel and the like. A gel of freshly precipitated hydrated alumina may also be used in like amounts, as it is converted into active alumina during the final calcination of the catalyst.

As is noted above, the formation of magnesium chromate may be carried out either by adding a portion of the magnesia to an aqueous chromic acid solution or simply by dissolving the desired amount of $CrO_3$ in water and adding the solution to a uniform mixture of the iron oxide and magnesium oxide, whereby magnesium chromate is formed in situ. These methods of preparation present the important additional advantage that the introduction of alkali metal compounds such as potassium or sodium into the catalyst is avoided, which is an important factor in increasing the effective life of the catalyst. Our experiments have shown that even small amounts of potassium, for example, will cause the catalyst to lose most of its activity after a few days of use unless the carbon monoxide gases have been carefully purified. We believe that this loss of activity is caused by the formation of an alkali metal sulfate coating, which is brought about by reaction of sodium or potassium in the catalyst with sulfur compounds in the carbon monoxide gas. This is indicated by the fact that a prior art catalyst of the type described above, prepared by mixing potassium bichromate solution with iron oxide and magnesium oxide, poisoned very rapidly in a steam-carbon monoxide gas containing 1000 parts per million of hydrogen sulfide; the poisoned catalyst was found to be encrusted with a coating consisting mainly of potassium sulfate.

The catalysts of our invention can be operated at temperatures of about 450° C. to 600° C. at space velocities on the order of 1800-2200, using an inlet gas containing about 35% of carbon monoxide and a steam:CO ratio of about 2.5. Under these conditions the exit gas contains from about 2.2 to about 5.5% of carbon monoxide.

The invention will be further illustrated by the following specific example:

A pigment grade $Fe_2O_3$ having an average particle size of about 0.5 micron was used. A mixture of 200 lbs. of this iron oxide with 50 lbs. of active magnesia was prepared, the magnesia being a precipitated magnesium hydroxide that had been calcined at 300-400° C. for about 4 hours.

A solution of 12 lbs. of $CrO_3$ in 36 lbs. of water was prepared and was added to the magnesia-iron oxide mixture by spraying slowly with continuous agitation. Five pounds of powdered graphite were then added.

In the resulting material all of the visible moisture had disappeared and a dry and free-flowing powder was obtained. No heating was necessary, as the active magnesia reacted easily with the chromic acid solution to form a mixture of partially hydrated magnesia and magnesium chromate. The material was then passed through a ten mesh screen and was formed into pellets of $\frac{7}{16}$ inch diameter on a rotary pelleting machine. The setting on the punches was such as to give an initial crushing strength of 5-10 lbs.

The pelleted material was placed in a closed container and allowed to age for about 24 hours. Experience has shown that this aging step is very important when catalyst pellets of high mechanical strength are desired, as it helps the hydration of the magnesia and aids in forming a uniform hydraulic cement bond in the catalyst. The aged pellets were then calcined at 550-650° C. for about 1-3 hours by contact with hot products of combustion in a rotary kiln. After cooling, the catalyst was ready for use.

Tests made on the pelleted catalysts after conditioning for 24 hours but prior to calcination showed an average crushing strength of 55 lbs. After calcination the average crushing strength of the pellets was 50 lbs.

The catalyst was tested with a carbon monoxide gas having the following composition:

| | | |
|---|---|---|
| CO | per cent | 37 |
| $CO_2$ | do | 6 |
| $O_2$ | do | 0.5 |
| $H_2$ | do | 36 |
| $CH_3$ | do | 0.5 |
| $N_2$ | do | 20 |
| $H_2S$ | P. P. M. | 1000 |
| Organic sulfides and tarry materials, about | P. P. M. | 500 |

The steam to carbon monoxide ratio was 2.5:1, and temperatures of 485-500° C. and a space velocity of about 2000 were maintained during the first week. The catalyst was then maintained at 545-555° C. during a run of four months, using the same steam to gas ratio and the same space velocity. The average conversion during this run was 86.4%; on the last day of the run the conversion was 86.1%, showing that the catalyst had retained its activity throughout the entire test.

Wha we claim is:

1. A method of producing an iron oxide-magnesia catalyst of high activity and improved mechanical strength which comprises preparing a mixture of $Fe_2O_3$, about 10-100% of "active magnesia" based on the weight of the iron oxide and about 3-40% of magnesium chromate and sufficient water to hydrate all of the magnesia, compressing said mixture into pellets, aging the pellets while retaining their water content to form therein a set hydraulic cement, and subsequently dehydrating the pellets by calcining them at 500-650° C.

2. A method of producing an iron oxide-magnesia catalyst of high activity and improved mechanical strength which comprises preparing a mixture of $Fe_2O_3$, about 10-100% of "active magnesia" based on the weight of the iron oxide and about 3-40% of magnesium chromate and about 50-100% of water based on the weight of said magnesia, compressing the mixture into pellets while retaining therein sufficient water to hydrate all of the magnesia, aging the pellets while retaining their water content to form therein a set hydraulic cement, and subsequently dehydrating the pellets by calcining them at 500–650° C.

3. A method according to claim 2 in which about 0.5% to 2% of active alumina, based on the weight of the iron oxide, is incorporated into the mixture prior to pelleting.

4. A chromium oxide-activated iron oxide-magnesia catalyst in the form of pellets of high activity and improved mechanical strength, said pellets consisting essentially of finely divided $Fe_2O_3$ and a set hydraulic cement formed by mixing said $Fe_2O_3$ uniformly with about 10–100% of its weight of active magnesia and about 3–40% of its weight of magnesium chromate together with about 50–100% of water based on the weight of said magnesia, compressing the mixture into pellets while retaining therein sufficient water to hydrate all of the magnesia, aging the pellets while retaining their water content to form therein said set hydraulic cement, and then dehydrating the pellets by calcining them at 500–650° C.

KENNETH D. ASHLEY.
WILLIAM B. INNES.

REFERENCES CITED

The following references are of record in the file of this patent:

UNITED STATES PATENTS

| Number | Name | Date |
| --- | --- | --- |
| 1,680,807 | Schultze | Aug. 14, 1928 |
| 2,063,302 | Eversole | Dec. 8, 1936 |
| 2,419,255 | Dely | Apr. 22, 1947 |